United States Patent [19]
Alten

[11] Patent Number: 5,374,154
[45] Date of Patent: Dec. 20, 1994

[54] RAMP BRIDGING MECHANISM

[76] Inventor: Kurt Alten, Ringstr. 14, D-30974 Wennigsen, Germany

[21] Appl. No.: 123,003

[22] Filed: Sep. 17, 1993

[30] Foreign Application Priority Data

Sep. 19, 1992 [DE] Germany ............................ 4231476

[51] Int. Cl.⁵ .............................................. E01D 1/00
[52] U.S. Cl. ..................................... 414/537; 14/71.1; 414/401
[58] Field of Search ................. 414/537, 401; 14/69.5, 14/71.1

[56] References Cited

U.S. PATENT DOCUMENTS

| | | | |
|---|---|---|---|
| 2,251,358 | 8/1941 | Judd et al. | 414/537 |
| 4,325,155 | 4/1982 | Alten | 14/71.1 |
| 4,382,307 | 5/1983 | Alten | 14/71.1 |
| 4,554,695 | 11/1985 | Rowland | 14/69.5 |
| 4,619,004 | 10/1986 | Kovach et al. | 14/71.1 |

FOREIGN PATENT DOCUMENTS 3104555 2/1981 Germany.

Primary Examiner—Michael S. Huppert
Assistant Examiner—Thomas J. Brahan
Attorney, Agent, or Firm—Robert W. Becker & Associates

[57] ABSTRACT

A ramp bridging mechanism having a bridge plate, the free end of which is provided with an extension. A support member is pivotably connected to the underside of the extension and supports the bridge plate in a position of rest. To free the pivot joint of the support member from support forces, an end of the support member can be displaced from a pivoted position toward the extension and into abutment against the extension, and vice versa, whereby during such displacement the position of the support member shifts relative to the transverse pivot axis.

11 Claims, 2 Drawing Sheets 5,374,154

RAMP BRIDGING MECHANISM

BACKGROUND OF THE INVENTION

The present invention relates to a ramp bridging mechanism having a bridge plate that at the end adjacent to the ramp or dock is mounted so as to be pivotable about a horizontal axis. Provided at the free end of the bridge plate is an extension that can be extended and retracted in the longitudinal direction of the bridge plate. The extension serves for resting upon a platform that is to be loaded or unloaded. A support member is connected to the underside of the extension or to the underside of an element of the bridge plate that moves along with the extension. The support member is pivotable relative to the extension about a transverse axis, with the support member serving to support the bridge plate on a fixed support when the bridge plate is in a position of rest.

Known ramp bridging mechanisms of this general type have support members that are hinged by crossbolts that must absorb the entire support forces when a bridge plate is in a position of rest, and that therefore are vulnerable or at risk, especially when the load changes (see, for example, German Offenlegungschrift 31 04 555).

It is therefore an object of the present invention to free the pivot location between the extension and the support member from support forces when the bridge plate is in a position of rest.

BRIEF DESCRIPTION OF THE DRAWING

This object, and other objects and advantages of the present invention, will appear more clearly from the following specification in conjunction with the accompanying schematic drawing, in which.

SUMMARY OF THE INVENTION

Figure 1:
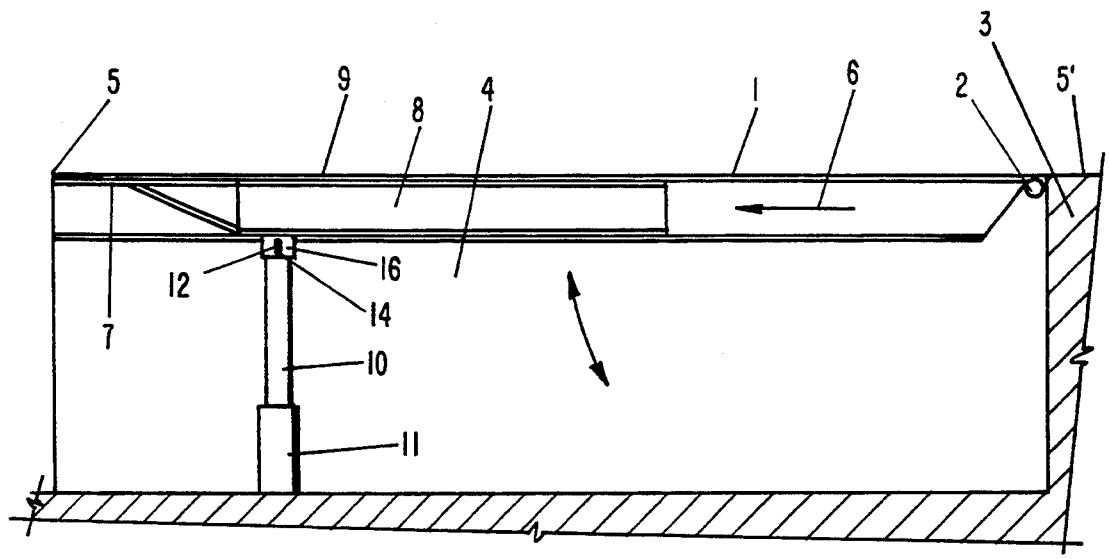
FIG. 1 is a side view of one exemplary embodiment of the inventive ramp bridging mechanism in a position of rest.

The ramp bridging mechanism of the present invention is characterized primarily by means that permit displacement of an end of the support member from a pivoted position toward the extension and into abutment against the extension, and vice versa, whereby during such displacement, the position of the at least one support member shifts relative to said transverse axis.

In a not yet displaced state of the support member, in other words when the bridge plate is in operation, the support member is in its pivoted position with the aid of a crossbolt that in such a pivoted position defines the transverse pivot axis. If a load is placed upon the support member, it can move relative to the extension, with the upper end face of the support member then coming to rest against the extension. The support member then assumes support for the bridge plate, with the crossbolt being entirely free of support forces. To accomplish this, it is merely necessary to provide slot means for engagement by the crossbolt. Thus, displacement of the support member involves relative movement between the crossbolt and the slot means, with the support member assuming an end position where its upper end face rests against the bottom of the extension.

Thus, both at the bottom and at the top support is provided by the respective end faces of the support member, which under such conditions can readily adsorb considerable forces, even changing loads.

Further specific features of the present invention will be described in detail subsequently.

DESCRIPTION OF PREFERRED EMBODIMENTS

Referring now to the drawing in detail, at the rear end of the mechanism that faces the dock, a bridge plate 1 is pivotably mounted to the ramp or dock 3 about a transversely extending shaft 2; the dock 3 is provided with an upper surface 5' and has a recessed area 4 for accommodating the bridge plate 1 and the rim 5 of the dock. Disposed at the front end of the bridge plate 1 is an extension means 7 that can be extended in the direction of the arrow 6, but can also be again retracted. The extension means 7 is secured to a slide or carriage means 8 that can be moved, for example via a hydraulic cylinder. The extension means 7 serves to rest upon the platform of a vehicle that is to be loaded or unloaded. The bridge plate 1 is thus supported by the extension means 7 and can therefore follow any changes in height of the platform.

The bridge plate 1 can be pivoted upwardly or downwardly in a customary manner by a non-illustrated hydraulic lifting cylinder.

So that traffic on the dock can proceed in an undisturbed manner when the ramp bridging mechanism is in a position of rest, the upper surface 9 of the bridge plate 1 is disposed at the same level as the upper surface 5' of the dock. However, this is possible only because the extension means 7, i.e. the slide or carriage means 8 thereof, and hence the bridge plate 1, are supported by a vertically extending support member 10 that at the bottom rests upon a projection or raised portion 11 of the base of the recessed area 4, in other words, that can rest upon a fixed support.

The support member 10 is embodied as a pivotably suspended support member. In particular, in the region of its upper end the support member 10 is connected to a crossbolt 12, the two opposite ends 13 of which engage vertically extending slots 14 that are formed in angle brackets 15 that are welded to the extension means 7, i.e. to the slide or carriage means 8 thereof. The vertical legs 16 of the angle brackets 15 are disposed in such a way that the support member 10, which has a flat rectangular cross-sectional area, can move and pivot in an unobstructed manner between the two legs 16.

It is important that not only the lower horizontal end face 17 of the support member 10 rest upon the projection 11, but also that the slide or carriage means 8 rests upon the upper horizontal end face 18 of the support member 10 in order to achieve an optimum stressing of the support member 10. To accomplish this, the slots 14 and the crossbolt 12 are disposed in such a way that in the support or working position illustrated in FIG. 2 a slight amount of play 19 remains above the crossbolt 12 so that, as illustrated, the support can be effected via the end face 18.

When the bridge plate 1 is pivoted upwardly and the support member no longer provides a support function, the weight of the support member 10 causes it to slide downwardly until the ends 13, in conformity with the length of the slots 14. rest upon the lower rounded portions of the slots. In this position, pivot movements of the support member 10 that are required for the operation of the ramp bridging mechanism can be carried out, for example toward the front into an approximately horizontal position in conformity with the angle "a", or in the opposite direction in conformity with the angle "b". A pivoting toward the rear can be necessary, for example, if obstacles are encountered when the extension means 7 is extended, while a pivoting of the support member 10 toward the front may be expedient if, for example, the extension means 7 is to be drawn in in a lowered state of the bridge. With all of these movements of the support member 10 the ends 13 of the crossbolt 12 serve as pivot axes, although the ends 13 play no role during support of the bridge plate 1.

Furthermore, the displaceable mounting of the crossbolt 12 in the slots 14 enables a correction of the position of the support member 10, for example if the latter is initially not seated flushly but rather rests upon an edge. A tilting or canting moment occurs that ensures the position of the support member 10 in the normal or vertical position shown in FIGS. 2 and 3.

Figure 2:
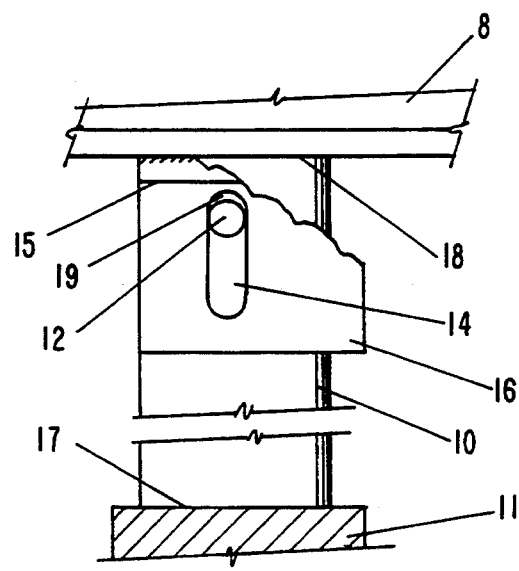
FIG. 2 is an enlarged view of the ramp bridging mechanism of FIG. 1 showing the support member in an operative position.
Figure 3:
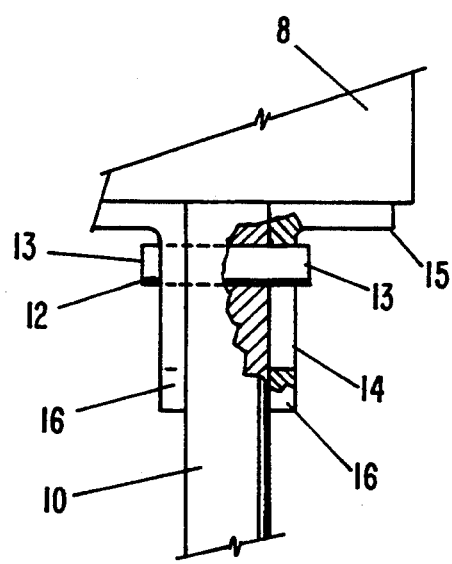
FIG. 3 shows the support member of FIG. 2 from the front, i.e., looking in a direction toward the dock.
Figure 4:
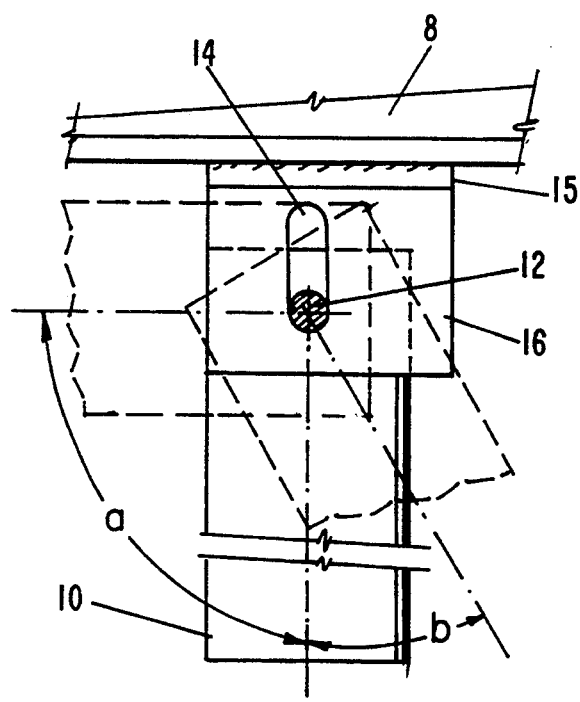
FIG. 4 shows the support member of FIG. 2 in various pivoted positions.
Figure 5:
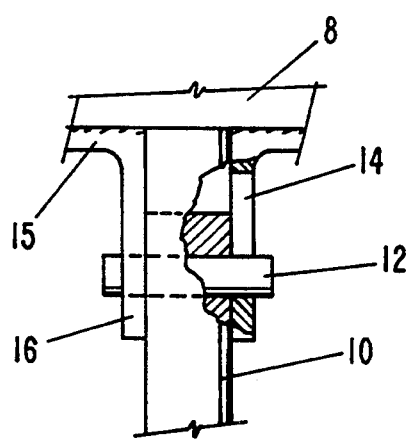
FIG. 5 is a front view of the support member of FIG. 4.

It should be noted that whereas no pivoting of the support member 10 can take place in the positions illustrated in FIGS. 1–3 (and FIG. 6), in FIGS. 4 and 5 the support member 10 and hence the crossbolt 12 have shifted such that the crossbolt 12 now corresponds with the transverse pivot axis and the support member 10 can pivot.

Figure 6:
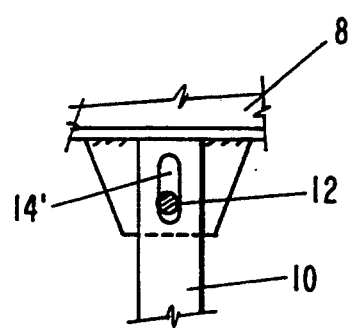
FIG. 6 is a side view of a modified support member in the operative position.

Instead of the embodiment illustrated in FIGS. 1–5, it is also possible to have an embodiment such as that shown in FIG. 6, where the crossbolt 12 is provided on the extension means 7, i.e. on the slide or carriage means 8 thereof, and the support member 10 is provided with a slot 14'.

It should also be noted that instead of providing just a single support member 10, two or more support members 10 could be distributed over the width of the bridge.

The present invention is, of course, in no way restricted to the specific disclosure of the specification and drawing, but also encompasses any modifications within the scope of the appended claims.

What I claim is:

1. A ramp bridging mechanism comprising:
   a bridge plate having a first end that is mounted on a dock such that it is pivotable about a horizontal axis, and having a second, free end that is provided with an extension means that can be extended and retracted in a longitudinal direction of said bridge plate, with said extension means serving for resting upon a platform that is to be loaded or unloaded;
   at least one support member that is connected to an underside of said extension means such that said at least one support member is pivotable relative to said extension means about a transverse axis, with said at least one support member serving to support said bridge plate on a fixed support when said bridge plate is in a position of rest; and
   means permitting a longitudinal displacement of an end of said at least one support member from a pivoted position toward said extension means and into abutment against said extension means, and vice versa, whereby during such displacement, the position of said at least one support member shifts to permit alignment of said at least one support means between said extension means and said fixed support.

2. A ramp bridging mechanism according to claim 1, wherein said means permitting a longitudinal displacement of said at least one support member is a crossbolt of one of said extension means and said at least one support member, and a slot means of the other of said at least one support member and said extension means.

3. A ramp bridging mechanism according to claim 2, wherein when said end of said at least one support member is in abutment against said extension means, said crossbolt at most just comes into contact with an adjacent rounded end of said slot means.

4. A ramp bridging mechanism according to claim 3, wherein a play exists between said crossbolt and said adjacent rounded end of said stop means.

5. A ramp bridging mechanism according to claim 2, wherein in a pivoted position of said at least one support member, said crossbolt rests against a rounded end of said slot means.

6. A ramp bridging mechanism according to claim 2, wherein said slot means has such a length that when viewed in a longitudinal direction of said bridge plate, said at least one support member is pivotable to the front and to the rear, and in a working support position of said at least one support member, an end face of said end of said at least one support member abuts flushly against said extension means.

7. A ramp bridging mechanism according to claim 2, wherein said at least one support member is provided with said crossbolt, which has two ends and is spaced from said end of said at least one support member, and said extension means is provided with said slot means in the form of two slots, each of which receives one of said ends of said crossbolt.

8. A ramp bridging mechanism according to claim 7, wherein said extension means is provided with two legs that extend at right angles therefrom and between which said at least one support member is received with enough play to permit pivoting thereof, said legs being provided with said slots.

9. A ramp bridging mechanism according to claim 2, wherein said at least one support member is provided with said slot means in the form of a single slot, and said extension means is provided with said crossbolt, which extends through said slot of said at least one support member.

10. A ramp bridging mechanism according to claim 9, wherein said extension means is provided with two legs that extend at right angles therefrom and between which said at least one support member is received with enough play to permit pivoting thereof, said legs being provided with said crossbolt.

11. A ramp bridging mechanism according to claim 2, wherein said extension means comprises a slide or carriage that is movably supported in said bridge plate, and an extension that is connected to said carriage.

* * * * *